(12) United States Patent
Belanger et al.

(10) Patent No.: US 7,610,241 B1
(45) Date of Patent: Oct. 27, 2009

(54) METHOD AND APPARATUS FOR EVALUATING OPTIMAL ACCESS PROVIDERS FOR LONG HAUL COMMUNICATION PROVIDERS

(75) Inventors: David Belanger, Hillsborough, NJ (US); Sam Parker, Cranbury, NJ (US); Sarat Puthenpura, Berkeley Heights, NJ (US); Wenjie Zhao, Princeton, NJ (US)

(73) Assignee: AT&T Corp, New York, NY (US)

( * ) Notice: Subject to any disclaimer, the term of this patent is extended or adjusted under 35 U.S.C. 154(b) by 184 days.

(21) Appl. No.: 11/602,009

(22) Filed: Nov. 20, 2006

(51) Int. Cl.
*G06Q 40/00* (2006.01)
(52) U.S. Cl. ...................................................... 705/37
(58) Field of Classification Search ............... 705/37
See application file for complete search history.

(56) References Cited

U.S. PATENT DOCUMENTS

| | | | | |
|---|---|---|---|---|
| 6,751,597 | B1* | 6/2004 | Brodsky et al. ............... | 705/37 |
| 7,346,571 | B1* | 3/2008 | Fujita .......................... | 705/37 |
| 2001/0025209 | A1* | 9/2001 | Fukui et al. .................. | 700/291 |
| 2002/0016759 | A1* | 2/2002 | Macready et al. ............ | 705/37 |
| 2002/0077954 | A1* | 6/2002 | Slaight et al. ................. | 705/37 |
| 2002/0099578 | A1* | 7/2002 | Eicher et al. .................. | 705/7 |
| 2002/0099579 | A1* | 7/2002 | Stowell et al. ................ | 705/7 |
| 2002/0133368 | A1* | 9/2002 | Strutt et al. ................... | 705/1 |
| 2003/0028473 | A1* | 2/2003 | Eso et al. ...................... | 705/37 |
| 2003/0033236 | A1* | 2/2003 | Davenport et al. ........... | 705/37 |
| 2003/0050819 | A1* | 3/2003 | Koenigbauer et al. ........ | 705/8 |
| 2006/0047598 | A1* | 3/2006 | Hansen ........................ | 705/37 |

OTHER PUBLICATIONS

Unit Price Contracts: A Practical Framework for Determining Competitive Bid Prices John Burnett and Bruce M. Wampler, Journal of Applied Business Research, vol. 14, No. 3, Summer 1998, p. 63.*
Combinatorial and Quantity Discount Procurement Auctions Benefit Mars Incorporated and It's Suppliers Gail Hohner, John Rich and E. Ng. Interfaces Jan./Feb. 2003, p. 23.*
Trade Determination in Multi-attribute Exchanges, Kameshwaran S. Narahari Y, Proceeedings IEEE Conference on E Commerce Jun. 24-27, 2003.*

* cited by examiner

*Primary Examiner*—Alexander Kalinowski
*Assistant Examiner*—Bruce I Ebersman

(57) ABSTRACT

A method and an apparatus to automate the process and procedure for long haul service providers to choose the best quote from a pool of quotes or RFP responses as the best supplier in a country or region. The disclosed method and apparatus includes a mathematical framework which determines the characteristics of each supplier option and a method to determine the cost effectiveness of each option. This method and apparatus reduces overhead and improves the evaluation process for choosing optimal access providers for long-haul communication providers.

11 Claims, 6 Drawing Sheets

METHOD AND APPARATUS FOR EVALUATING OPTIMAL ACCESS PROVIDERS FOR LONG HAUL COMMUNICATION PROVIDERS

FIELD OF THE INVENTION

The present invention relates generally to a long haul service provider choosing the best quote from a pool of quotes or RFP responses as the best in a country or region. More particularly, the present application relates to the methods and associated apparatus needed to model various access cost scenarios as defined in supplier responses.

BACKGROUND OF THE INVENTION

For long-haul telecommunication service providers, access is a key component of the total cost. Whether the service is the classic time division multiplexed (TDM) service or modern packet services (e.g. ATM, Frame, or IP), often a significant portion of the end-to-end cost will be related to the access circuits. Access circuits connect end customer locations to the long-haul service provider's point of presence (pop). In most cases, the long-haul service provider (who generally is the end-to-end service provider) leases access circuits from third party suppliers. Before telecom deregulation was a world-wide phenomenon (over a decade or so ago), access providers were monopolies (in most situations, government owned). However, with rapid telecom deregulation happening in most countries in the world, access supply has become quite competitive. However, for players in the access arena, access supply may not be universal (that is, access may not be available by a given supplier in all geographical regions of a given country). Also, the tariff structures followed by the supplier may be complex, geography dependent, and may not be uniform. Almost invariably, access suppliers bundle circuits in different ways. Quite often, long-haul service providers seek quotes or (RFP responses) from access providers and attempt to choose the best suppliers in a country or region. When multiple overlapping bundles are present and circuit volume is large, manual analysis is typically not able to produce optimal suppliers for all circuits. Moreover, manual analysis requires significant time and resources and quickly becomes impractical as circuit volume and number of potential suppliers increase. Hence, there is a need for automated methods and associated apparatus to model various access cost scenarios in calibration with supplier responses. The present invention addresses this problem in a novel manner.

The problem solved by this invention is faced by long haul providers, access providers, and enterprise carriers in telecom; and also by many end customers. The fundamentals of this invention are applicable to any RFP response evaluations, where complex responses need to be processed quickly and efficiently.

Evaluating RFP responses for choosing the best access suppliers is a complex process. There are many factors that need to be taken into consideration. Telecom carriers look for access suppliers to lease access circuits in regions where their own network can not reach end customers cost effectively.

Access circuit leasing cost represents the dominant portion of the total cost of providing telecom services to end customers in some cases. To reduce access circuit leasing cost, carriers routinely ask all potential suppliers to bid on existing access circuit inventory via the RFP process. These RFP responses are analyzed to identify best suppliers for access circuits.

The circuit volume and complexity in RFP responses make it very difficult to identify optimal suppliers effectively. In many cases, suppliers provide bid pricing in circuit bundles where the pricing applies only if the suppliers are awarded all circuits in the bundle. Additionally, there is no standard for how suppliers bundle and present their circuits. Different suppliers may bundle circuits in totally different ways. Complexity increases as well in determining the lowest cost carrier due to comparing bundles that may or may not overlap among suppliers. These factors introduce significant combinatorial complexities in choosing the lowest cost supplier from the submitted RFP bids.

SUMMARY OF THE INVENTION

The present invention addresses the needs described above by providing a method and apparatus for automatically choosing the best quote by modeling various access cost scenarios as defined by supplier provided RFP's. The invention includes a method and system for modeling and analyzing the cost effectiveness of various supplier options. The model is cast into an optimization problem where the objective function and constraints are formulated to minimize the overall access cost and in the mean time satisfy all requirements and rules associated with RFP responses. The model can be easily edited, by changing the underlying business rules, in a very user friendly manner.

In general the method starts with a potential solution, causes that function and all constraints to become linear functions, solves for a solution using standard linear integer programming methods, records the value for this function and solution, repeats the solving over remaining potential solutions, and chooses the optimal solution as the potential solution and the associated solution that give the minimal value.

One embodiment is a method of identifying a best quote from a pool of RFP responses for implementing a business scenario. The method comprises the steps of gathering data from the RFP responses, including a plurality of supplier identities together with bid parameters associated with each said supplier identity, and further including constraints on the bid parameters; specifying a total cost of the business scenario as a non-linear objective function of the supplier identities and the bid parameters; specifying the constraints as mathematical constraint rules; linearizing the total cost function by assigning a first value to a selected bid parameter; minimizing the linearized cost function to find a lowest total cost supplier at the first value of the selected bid parameter, subject to the mathematical constraint rules; repeating the linearizing and minimizing steps using additional values of the selected bid parameter, until a supplier and a value of the bid parameter yield a minimum total cost C; and selecting the supplier and bid parameter yielding the lowest total cost C.

The bid parameters in that method may include at least a circuit identity, a technology to be used in the circuit and a discount.

The method may further include the step of gathering data for current circuits, including at least one current supplier identity and current supplier parameters associated with each said current supplier. The selected bid parameter in that method may be a discount variable.

The method may further include the step of linearizing the total cost function by assigning a first value to a selected bid parameter comprises assigning a feasible first value. The feasible first value of the selected bid parameter of the method may be determined, at least in part, using the constraint equations.

Another embodiment of the invention is a method of identifying a best quote from a pool of RFP responses for implementing a business scenario. The method comprising the steps of gathering data from the RFP responses and existing circuitry, including a plurality of supplier identities s, identities of access circuits n, technologies t and discount levels d associated with each said supplier identity s; specifying a total cost function C of the business scenario as $$C = \sum_{n,s,t} x(n, s, t) \cdot \left( \sum_d (mrc(n, s, t, d) \cdot m + otc(n, s, t, d)) \cdot y(s, d) + \right.$$

$$\left. (1 - cursp(n, s)) \cdot (mig(n, s, t) + incent(n)) \right) +$$

$$\sum_n \left( 1 - \sum_{s,t} opt(n, t) \cdot x(n, s, t) \right) \cdot c(n) \cdot m$$

wherein x(n,s,t) is a binary variable indicating whether a bid by supplier s with technology t is the optimal solution for circuit n; mrc(n,s,t,d) is a bid monthly price for circuit n by supplier s using technology t at discount level d over m months; otc(n,s,t,d) is a one time charge for bid pricing for circuit n by supplier s using technology t at discount level d; y(s,d) is a binary variable indicating whether discount level d is offered by supplier s; cursp(n,s) is a binary variable indicating whether a current supplier for circuit n is supplier s; mig(n,s,t) is a one time migration cost incurred for moving a circuit n to supplier s with technology t; incent(n) is a one time customer incentive for circuit n; opt(n,t) is a technology feasibility indicator for technology t on circuit n and c(n) is a current monthly cost of access circuit n. The method further includes the steps of gathering bid constraints from the RFP responses; specifying the constraints as mathematical constraint rules; linearizing the total cost function C by assigning a first value to the binary variable y(s,d) indicating discount level y for supplier s; minimizing the linearized cost function to find a lowest total cost supplier s at the first value of the binary variable y(s,d), subject to the mathematical constraint rules; repeating the linearizing and minimizing steps using additional values of the binary variable y(s,d), until the total cost C is minimized; and selecting the best quote based on the minimized total cost C.

The bid constraints of the method may include bundle group identification, circuit bundle pricing, and volume discount information.

The method may further comprise the step of gathering the existing circuit inventory. The existing circuit inventory may include circuit speed, start and end location, and current monthly cost.

The existing circuit inventory of the method may be compared against the RFP responses using the total cost function C.

Another embodiment of the invention is a machine-readable medium having instructions recorded thereon, such that when the instructions are read and executed by a machine, the machine performs a method of identifying a best quote from a pool of RFP responses for implementing a business scenario. The method comprises the steps of gathering data front the RFP responses, including a plurality of supplier identities together with bid parameters associated with each said supplier identity, and further including constraints on the bid parameters; specifying a total cost C of the business scenario as a non-linear objective function of the supplier identities and the bid parameters; specifying the constraints as mathematical constraint rules; linearizing the total cost function by assigning a first value to a selected bid parameter; minimizing the linearized cost function to find a lowest total cost C supplier at the first value of the selected bid parameter, subject to the mathematical constraint rules; repeating the linearizing and minimizing steps using additional values of the selected bid parameter, until a supplier and a value of the bid parameter yield a minimum total cost C; and selecting the supplier and bid parameter yielding the lowest total cost C.

BRIEF DESCRIPTION OF THE DRAWINGS

FIG. 4 is a geometric representation of the mathematical model the analysis is built on.

DESCRIPTION OF THE INVENTION

Figure 1:
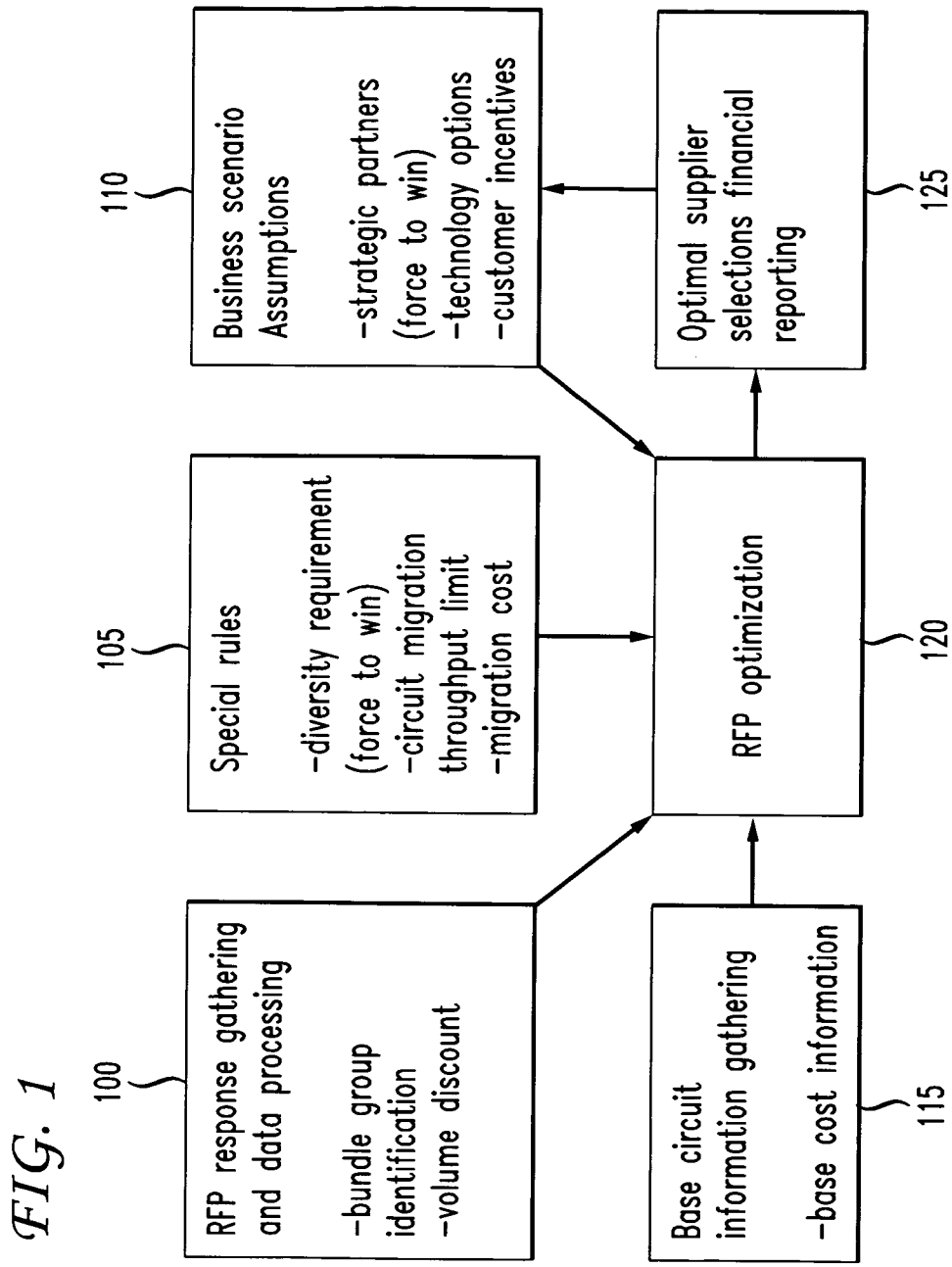
FIG. 1 is a schematic representation of the analysis model definition and solution logic.

The inventors have developed a method and apparatus for automatically choosing the best quote by modeling various access cost scenarios in calibration with supplier responses.

The system of the invention models and analyzes the cost effectiveness of various supplier options. The model is constructed as a set of mathematical rules which determine optimal supplier selections among available RFP responses to minimize total access cost. The model can be easily edited (by changing the underlying business rules) in a very user friendly manner. This in turn fosters quick adaptation of the model to changing business conditions.

The steps to making the objective function linear follow below.

1. Start with a possible discount level d for each supplier s and solve for x.

2. Based on the solution for x, derive the discount level for each supplier. This should be same as the assumed discount level before solving for x. If these discount levels are different, then the solution for x is not valid and should be discarded.

3. Repeat the same process for all possible discount levels for each supplier.

The best overall solution for x is the optimal solution having the least value for the objective function. All discount level info is provided by supplier and entered by the business manager in the user interface.

The functional blocks (modules) of the method/apparatus are outlined below. Basically the entire information infrastructure and its components are modeled in a mathematical framework.

The following is a typical model description:
Let n be the index of access circuits, n=1 . . . N.
Let s be the index of suppliers, s=1 . . . S.
Let j be the index for bid bundle groups, j=1 . . . J.
Let t be the index of technologies for providing access service, t=1 . . . T.
Let d be the index of bid pricing discount levels, d=1 . . . D. Supplier prices vary by discount level. The unit price is calculated based on the quantity being purchased. Basically the larger the purchase from a given supplier, the cheaper the unit price. In the formula, the supplier monthly price mrc variable is a function of discount level d.

Then

The current monthly cost of access circuits can be denoted as c(n) (>0).

The current supplier for access circuits is noted as cursp(n,s), where cursp(n,s)=1 if supplier s is the current supplier for circuit n, it is 0 otherwise, The bid monthly price can be noted as mrc(n,s,t,d) for circuit n by supplier s using technology t at discount level d.

The one time charge for bid pricing can be noted as otc(n,s,t,d) for circuit n by supplier s using technology t at discount level d (otc(n,s,t,d)>=0).

The one time migration cost incurred by carrier itself for moving circuit n to supplier s with technology t is mig(n,s,t) when the optimal supplier is different from the current supplier.

The one time customer incentive provided by carrier to customer for circuit n is noted as incent(n) when the optimal supplier s is different from the current supplier.

The bundle group for bid pricing can be noted as g(n,s,t,j), where g(n,s,t,j)=1 if bid from supplier s with technology t for circuit n belongs to group j, otherwise it is 0.

The minimum volume commitment level (the minimum number of circuits that must be awarded to a supplier in order to get the associated bid pricing at the corresponding discount level) is noted as volcom(s,d).

The minimum spending commitment level (the minimum amount of monthly recurring revenue that must be awarded to a supplier in order to get the associated bid pricing at the corresponding discount level) is noted as mrccom(s,d).

Some circuits may have to be awarded to a given supplier or a reduced number of suppliers due to circuit diversity requirements and other conditions regardless actual supplier bid pricing. This "force to win" matrix can be noted as f(n,s) where f(n,s)=1 if supplier s is one of the candidate suppliers that is eligible to win circuit n, it is 0 otherwise;

A technology option t may or may not be a valid option due to physical constraints required to implement such technology for a given circuit. The technology feasibility indicator can be noted as opt(n,t), where opt(n,t)=1 when technology t is feasible for circuit n, it is 0 otherwise;

Let x(n,s,t) be the binary variable that indicates if the bid by supplier s with technology t is the optimal solution for circuit n (it takes value 1 when this is true, otherwise it is 0, x(n,s,t) exists if and only if x(n,s,t)=1). Let y(s,d) be the discount level variable for supplier s, where y(s,d)=1 if supplier s is at discount level d, it is 0 otherwise. The function y(s,d) is a binary function always having the value of either 0 or 1. This function is set to 1 if only if supplier s is at discount level d.

Let z(j) be the binary variable that indicates if bid group j is a winning group or not. It is 1 if this is a winning group, it is 0 otherwise.

The objective of RFP evaluation is to find an optimal solution for x(n,s,t) and y(s,d) that minimizes the total cost C over an analysis period of m months:

$$C = \sum_{n,s,t} x(n, s, t) \cdot \left( \sum_d (mrc(n, s, t, d) \cdot m + otc(n, s, t, d)) \cdot y(s, d) + (1 - cursp(n, s)) \cdot (mig(n, s, t) + incent(n)) \right) + \sum_n \left( 1 - \sum_{s,t} opt(n, t) \cdot x(n, s, t) \right) \cdot c(n) \cdot m$$

The solution is subject to the following constraints:

At most only one bid can be the winning bid for a given circuit (a circuit can stay with its existing supplier without migration):

$$\sum_{s,t} x(n, s, t) \le 1 \forall n \in (1 \wedge N).$$

Each supplier can be at one and only one discount level corresponding to a given solution set:

$$\sum_d y(s, d) = 1 \forall s \in (1 \wedge S).$$

The volume commitment and spending commitment must be satisfied:

$$\sum_{n,t} x(n, s, t) \ge \sum_d volcom(s, d) \cdot y(s, d) \forall s \in (1 \wedge S).$$

$$\sum_{n,t,d} x(n, s, t) \cdot mrc(n, s, t, d) \cdot y(s, d) \ge \sum_d mrccom(s, d) \cdot y(s, d) \forall s \in (1 \wedge S).$$

Bid bundle grouping constraints must be respected:

$$x(n,s,t) \cdot g(n,s,t,j) = z(j) \forall n,s,t.$$

Force to win constraints:

$$\sum_{n,s,t} x(n, s, t) \cdot (1 - f(n, s)) = 0.$$

Due to a carrier's internal throughput constraints, the total number of access circuits migrated from current suppliers to new suppliers is limited to mignum:

$$\sum_{n,s,t} x(n, s, t) \cdot (1 - cursp(n, s)) \le mignum.$$

The solution methodology for the above formulated mathematical problem follows. Since the objective function C is a nonlinear function of binary variables x(n,s,t) and y(s,d), standard linear programming solvers cannot be used to find the optimal solution directly. The following steps linearize the objective function C. Iterate over all the possible bid parameters, x(n,s,t), that are legitimate for a particular supplier discount y(s,d) and find an optimal solution for the bid parameter set x(n,s,t) where the objective function computes C to a minimum value.

The objective function is a non-linear function of the variables representing a bid parameter x and a discount value y (see the mathematical formula above). In this embodiment of the invention a feasible value is chosen for the discount value and substituted into the objective function and also into each of the mathematical statements representing the constraints. Setting a value to the discount variable removes a variable from the objective function, reducing the number of variables from 2 variables to 1 variable. The objective function having only one variable, namely the bid parameter set x, becomes a linear problem with respect to x.

The objective function can now be solved iteratively using a linear programming solver. For each of the runs of the objective function, the value of the objective function as well as the solution are recorded. The linear program solver is run once for each value of a supplier discount level. The linear program solver is run with the remaining feasible solutions representing all possible supplier discount levels. There are at most D discount levels and S suppliers, so there is a finite set of solution for the number of supplier discount levels and thus a finite number of iterations to run the linear programming solver. The solution set containing the pair of values representing a bid parameter set and a discount level that when used in the objective function yield the minimum value for the objective function is the optimal solution being solved for.

1. Start with a potential solution for the discount level y(s,d), then function C and all constraints become linear functions of bid parameter set x(n,s, t);
2. solve for x(n,s,t) using a standard linear integer programming solver (cplex for example);
3. record the value for C and solution x(n,s,t);
4. loop over remaining potential solution set for y(s,d), solve the linear programming problems;
5. The optimal solution comprises two elements. They are the potential solution y(s,d) and associated solution for x(n,s,t) that give minimum value for C.

FIG. 1 shows a representation for the mathematical model components and associated high level data flow. Initially, the responses are gathered and processed. Specific requirements from access suppliers in conjunction with these response data are identified and recorded (block 100) such as volume discount information, circuit pricing bundles. Additionally, the existing circuit inventory information is also gathered, including the circuit speed, start and end location, and current monthly cost (block 115). This cost is compared against RFP responses in the model in the determination of optimal supplier selections.

Special business rules relating to potential supplier migration are identified (block 105), for example circuit routing requirements, network provisioning throughput limit and unit circuit migration cost. In addition, special business rules such as diversity requirements may be implemented as "force to win" rules.

Business scenario assumptions (block 110) are also made regarding preferred strategic suppliers. For example the model may be forced to select preferred suppliers even though the preferred supplier pricing is suboptimal. There are also cases of technology incentives that are desired and technology options to be avoided as well as potential incentives to customers to facilitate successful circuit migration.

The analytical model for RFP optimization (block 120) takes all these described inputs and produces the optimal supplier selections that minimize the total cost over a pre-specified analysis period.

The model results are used to feed into downstream circuit migration activity to implement the optimal supplier selections 125. The model output also may be used to guide further changes to modify business assumptions for performing a what-if analysis.

Figure 2:
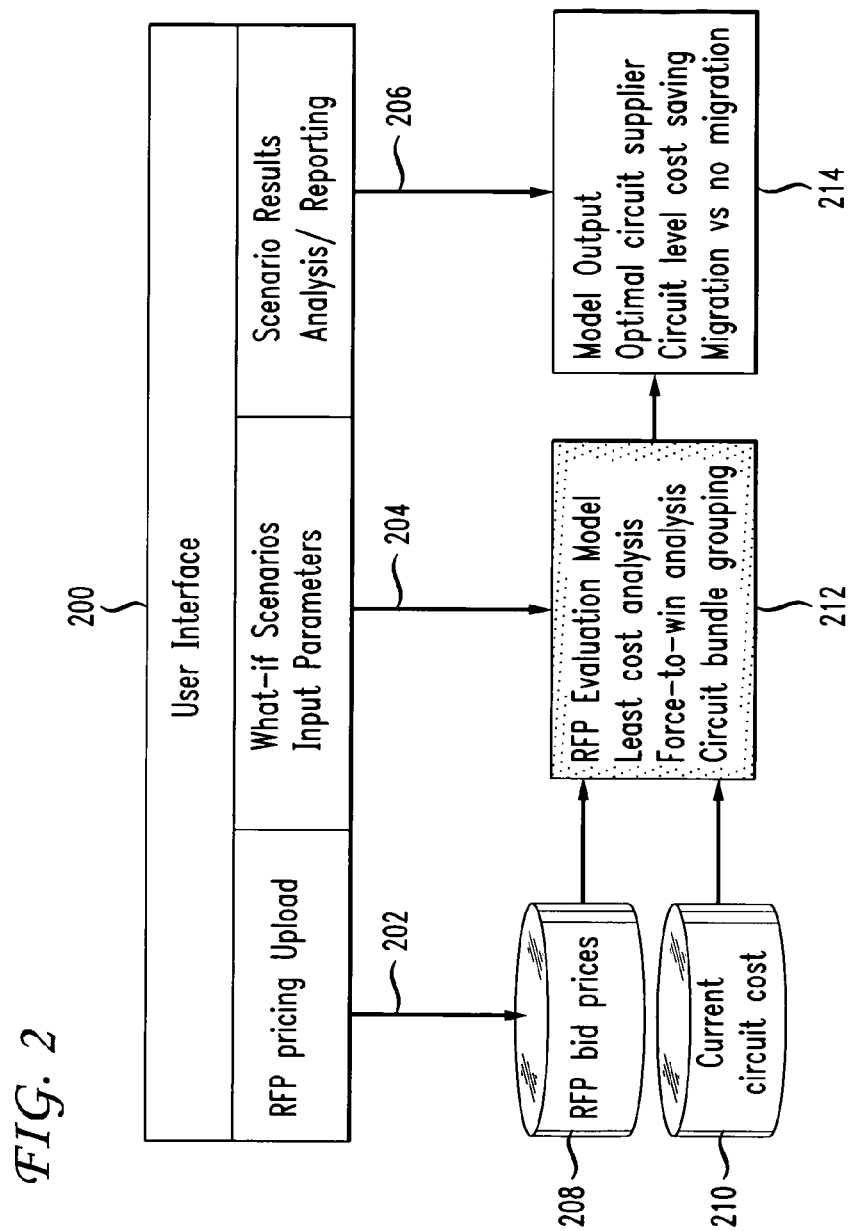
FIG. 2 is a schematic representation of the functional architecture of the analysis apparatus.

FIG. 2 shows the details of the functional architecture of the apparatus. The apparatus includes a computer or a cluster of computers, powered by the necessary software to execute the above-described functionality. In particular, the invention is implemented as software stored in a memory medium and executed by a computer or computers.

The architecture comprises the following components. A relational database including RFP bid prices 208, and current circuit costs 210 is accessible to the other software components. The databases are used to capture RFP response data, base circuit information, and other cost parameters and to store model output.

A web based system 200 is used to provide user interfaces for data upload, scenario parameter input, output, and result analysis. Together blocks 202, 204, 206 comprise the user interface. The business manager who evaluates RFPs uses these interfaces to enter information about each RFP. An RFP pricing upload permits the business manager to enter pricing information taken directly from each RFP provided by the suppliers. This information can become quite complex and introduces combinatorial complexity in the case where more than one supplier enters a bid on the same circuit(s). In interface 204, the business manager enters the constraint information that adds special circumstances to the business scenario and so limits the solution set. Interface 206 represents the final scenarios that the business manager uses taking advantage of the model optimization least cost analysis from the RFP evaluation model 212.

The RFP evaluation model 212 is preferably an LP solver. The model is used to find the optimal solution for circuit level supplier selection for a given set of business assumptions. The model 212 performs least cost analysis, forced-to-win analysis, and circuit bundle grouping.

Figure 3:
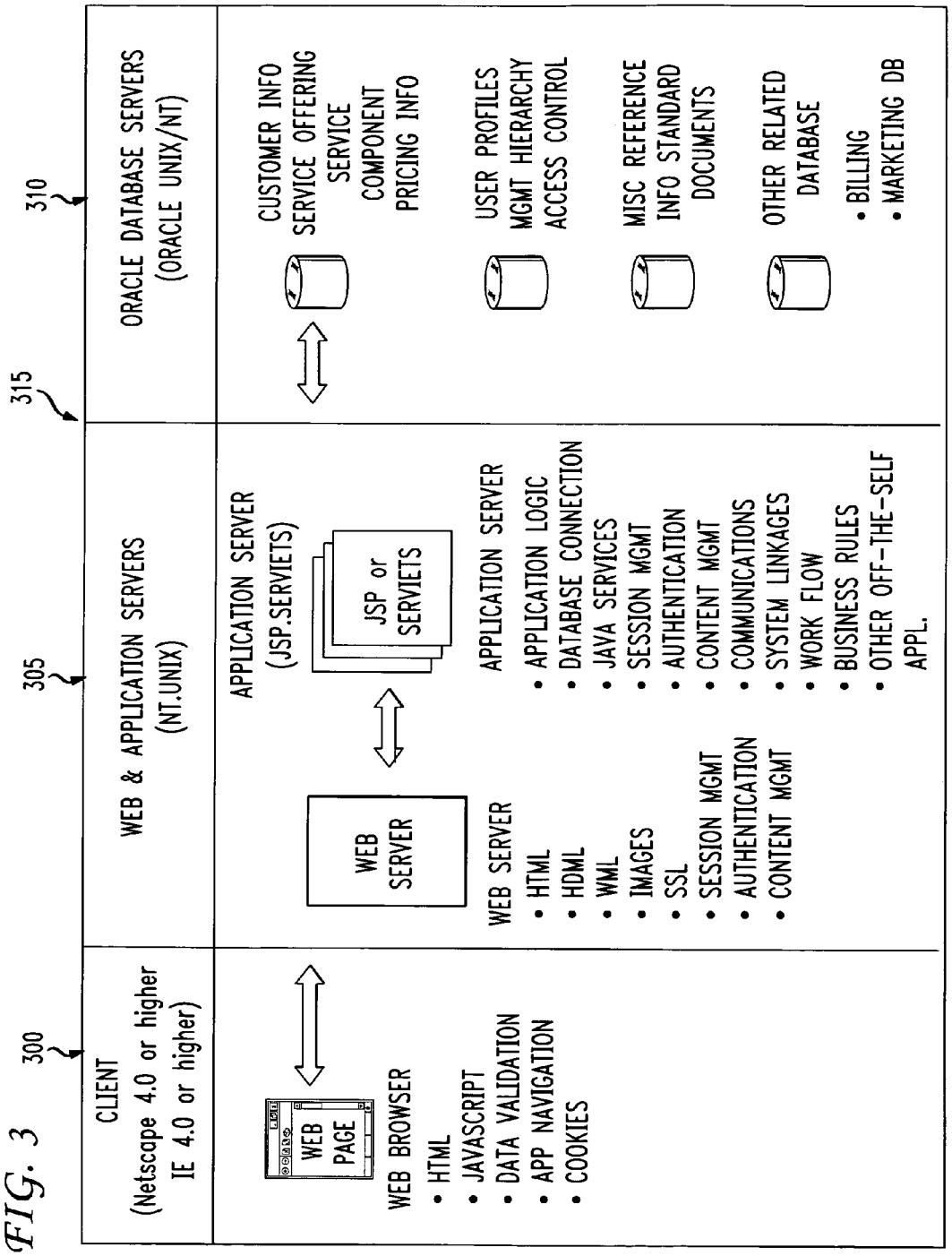
FIG. 3 is a schematic representation of the software architecture of the analysis apparatus.

Several individual layers of the software architecture 315 are shown in FIG. 3. Users access the system via a web browser 300. It is through the browser that the business manager enters the RFP information and interacts with the model output to find the best RFP. After the business manager enters the RFP pricing information, it is passed to the application server 305 where it is applied in the execution of the business logic. The application server houses the representations of the constraints imposed for these RFPs, as well as the business rules to calculate the cost of the circuitry. The backend of this architecture comprises relational databases 310. Those databases house the historical pricing information, stored information about migration costs and other special circumstances, and any other data used in the computation of the rules for computing the optimal cost to solve the access solution. These servers provide for making any necessary data queries and updates to the information stored in the relational databases 310.

Figure 4:
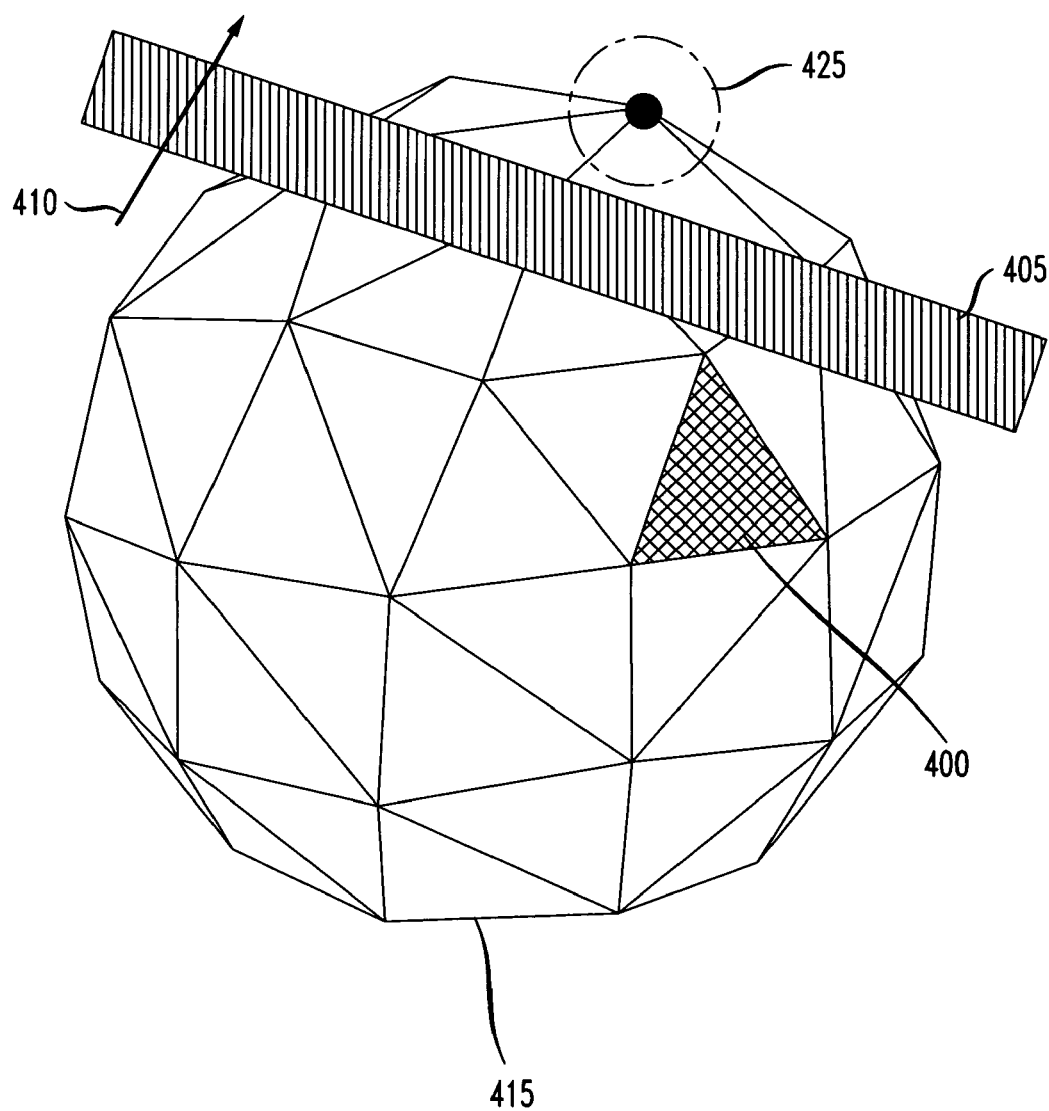

FIG. 4 is a geometric representation of the mathematical model of the method. The multi-dimensional polygon 415, often called a polytope, is a geometric representation of the constraint sets for a sample problem. Each face of this figure represents a constraint.

For example, the triangular area 400 is a constraint represented by the mathematical model. The plane 405 represents the objective function. The arrow 410 shows the direction of the path traveled for the cost to be reduced. The point 425 shows the most cost effective solution for the model. In each business problem modeled, there is one objective function and more than one constraint. Each vertex of the polytope 415 represents a feasible solution of the constrained problem. Out of all the feasible solutions, a mathematical programming algorithm finds the "best" or "optimal" solution (vertex) as efficiently as possible.

Figure 5:
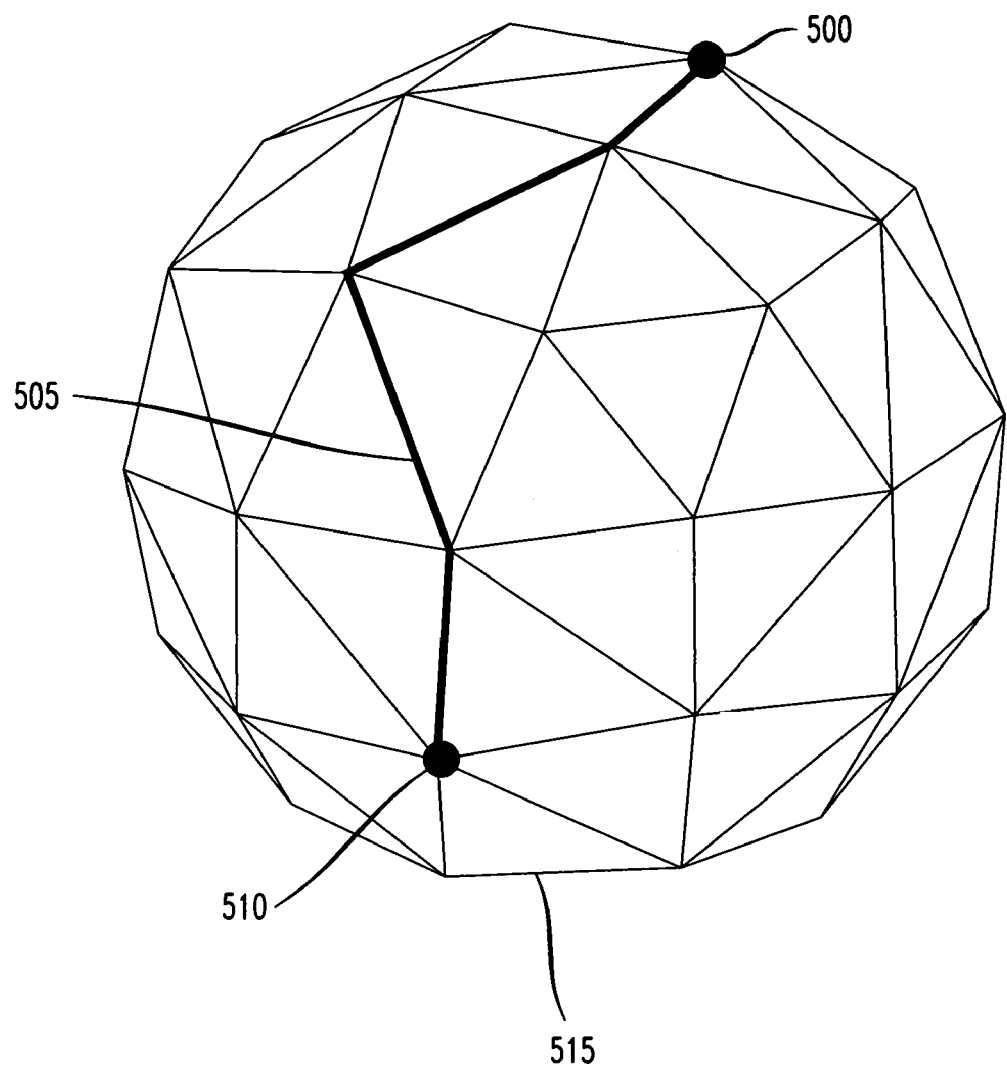
FIG. 5 is a geometric representation of the optimal solution path in the mathematical model.
Figure 6:
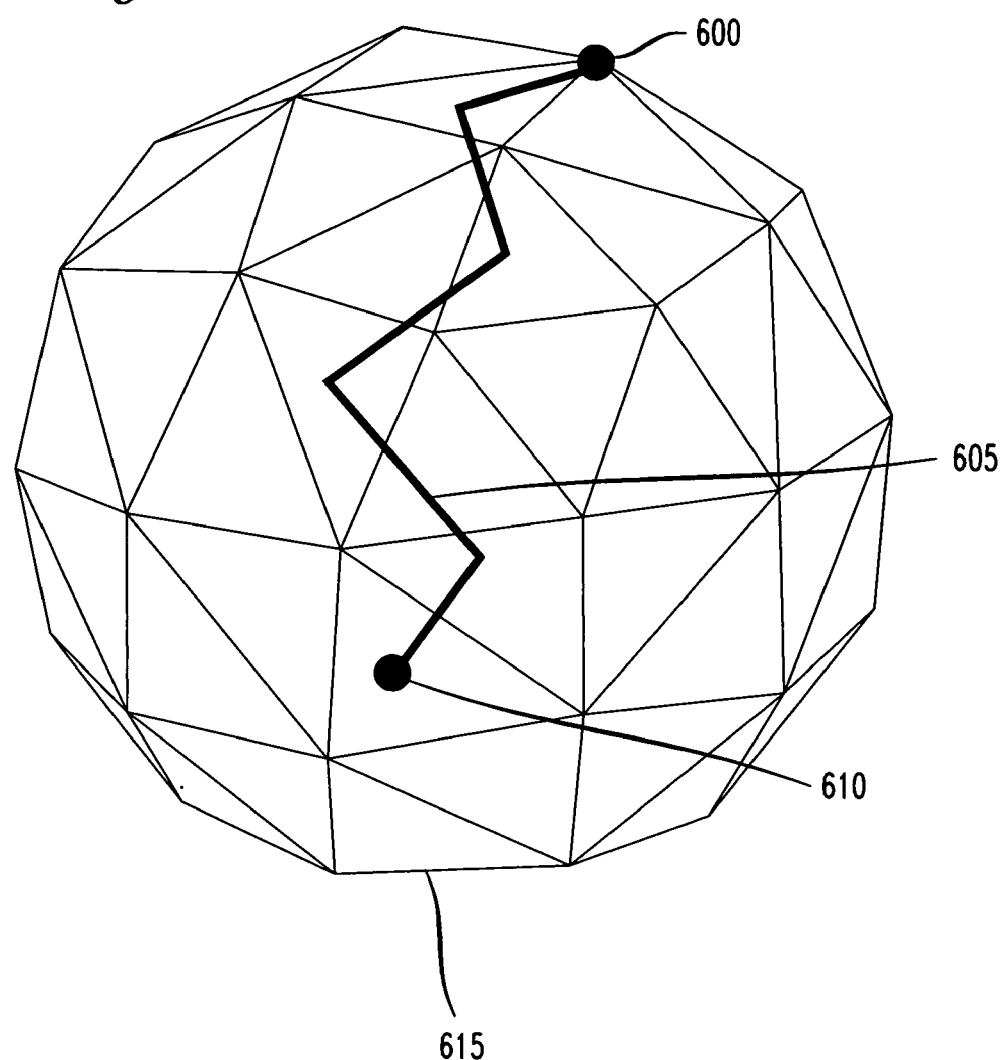
FIG. 6 is a geometric representation of an alternative solution path in the mathematical model.

The polytope figures represented in FIGS. 4-6 are a generic schematic representations of the complete set of feasible solution domains. Each plane is depicted as a face of the globe in the figure, and is also directly related to a particular constraint. These representations use a 3 variable example so as to be represented in a plane. The RFP problem addressed by the present invention, however requires a number of variables far greater than 3. Representing more than 3 variables is not easily translatable to these drawings and cannot be depicted by planes. The concept is the same; however; whether demonstrated with 3 variables or more. The representations are provided to show a simplified illustration using a concept of a plane.

FIG. 5 and FIG. 6 show two common approaches to finding the optimal solution effectively. FIG. 5 shows an approach 505m where the algorithm traverses a feasible solution path from a starting point 510 from vertex to vertex until the optimal solution 500 is reached. Note that the solution progresses through the edges of the polytope 515.

The search for solution x is done by a linear programming solver automatically. The solution path could be very different depending on which solver is used. However, the solution does not vary depending on the solver method. The solution is a consequence of the constraints in combination with the business scenario cost equation. The value of the objective function is used to evaluate if a feasible solution is better than before or not, where the evolution looks for a minimum value for the function.

An alternative path traversal choice 605 is shown in FIG. 6. FIG. 6 shows an interior point method where the algorithm starts with an interior point 610 of the polytope 615 and traverses through the interior of the polytope until the optimal solution vertex 600 is reached. These two techniques are used to solve the majority of constrained optimization problems such as in this invention.

The search for the optimal solution can be done in many different ways. A solver may traverse along the direction partial derivative vector which is the partial derivative of the objective function with respect to the variable x. This path may not be along the edges and so allows traversal along interior points.

The invention provides a unique combination of a set of components that provides flexibility, scaling, and extensibility to model and evaluate the RFP quotes of access providers. Although the invention is described herein with reference to a telecommunications example, the principle is applicable to a wide spectrum of industrial scenarios where a variety of supplier options must be evaluated.

This invention overcomes the difficulties of the prior art, wherein RFP analysis is laborious, time consuming and expensive. When multiple overlapping bundles are present and circuit volume is large, manual analysis typically could not produce optimal suppliers for all circuits. Prior art methods require significant time and resources and quickly become impractical as circuit volume and number of potential suppliers increase.

The method and apparatus may be applied to other businesses to analyze and select an optimal RFP. For each such case, an appropriate model is derived using the business methods used in the industry. The model will differ greatly from industry to industry, and requires a thorough internal investigation of the business methods of the application to derive the appropriate model.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to an optimal access supplier selection based on RFP response, the method and apparatus of the invention may be instead embodied by a system that models and analyzes any set of mathematical rules and constraints especially in a service industry where outsourcing is an option or processing RFP requests for any type of business, for example. It is further noted that the invention is not limited to use with bundle grouping, discount levels, and forced to win requirements, as described in this specification, but can be used with any constraints and technologies existing today or developed in the future. It is to be understood that the embodiments shown and described herein are only illustrative of the principles of the present invention and that various modifications may be implemented by those skilled in the art without departing from the scope and spirit of the invention.

What is claimed is:

1. A method of identifying a best quote from a pool of RFP responses for implementing a business scenario, the method to be performed by a computer system including a relational database and user interfaces, the method comprising the steps of:

gathering data from the RFP responses and existing circuitry, including a plurality of supplier identities s, identities of access circuits n, technologies t and discount levels d associated with each said supplier identity s;

specifying a total cost function C of the business scenario as $$C = \sum_{n,s,t} x(n,s,t) \cdot \left( \sum_d (mrc(n,s,t,d) \cdot m + otc(n,s,t,d)) \cdot y(s,d) + (1 - cursp(n,s)) \cdot (mig(n,s,t) + incent(n)) \right) + \sum_n \left( 1 - \sum_{n,t} opt(n,t) \cdot x(n,s,t) \right) \cdot c(n) \cdot m$$

wherein x(n,s,t) is a binary variable indicating whether a bid by supplier s with technology t is the optimal solution for circuit n; mrc(n,s,t,d) is a bid monthly price for circuit n by supplier s using technology t at discount level d over m months; otc(n,s,t,d) is a one time charge for bid pricing for circuit n by supplier s using technology t at discount level d; y(s,d) is a binary variable indicating whether discount level d is offered by supplier s; cursp(n,s) is a binary variable indicating whether a current supplier for circuit n is supplier s; mig(n,s,t) is a one time migration cost incurred for moving a circuit n to supplier s with technology t; incent(n) is a one time customer incentive for circuit n; opt(n,t) is a technology feasibility indicator for technology t on circuit n and c(n) is a current monthly cost of access circuit n;

specifying bid constraints as mathematical constraint rules that are functions of the gathered data;

linearizing by the computer system the total cost function C by assigning a possible value to the binary variable y(s,d) indicating discount level y for supplier s;

minimizing by the computer system the linearized cost function to find a lowest total cost supplier s at the possible value of the binary variable y(s,d), using a linear programming solver subject to the mathematical constraint rules;

repeating by the computer system the linearizing and minimizing steps using additional values of the binary variable y(s,d), until the total cost C is minimized; and selecting the best quote based on the minimized total cost C.

2. The method of claim 1 wherein the bid constraints include bundle group identification, circuit bundle pricing, and volume discount information.

3. The method of claim 1 further comprising the step of gathering the existing circuit inventory.

4. The method of claim 3 wherein the existing circuit inventory includes circuit speed, start and end location, and current monthly cost.

5. The method of claim 3 wherein the existing circuit inventory is compared against the RFP responses using the total cost function C.

6. The method of claim 1 wherein the bid constraints include the following rule requiring that at most only one bid can be the winning bid for a given circuit:

$$\sum_{s,t} x(n, s, t) \leq 1 \ \forall \, n \in (1 \ldots N).$$

7. The method of claim 1 wherein the bid constraints include the following rule requiring that each supplier can be at one and only one discount level corresponding to a given solution set:

$$\sum_{d} y(s, d) = 1 \ \forall \, s \in (1 \ldots S).$$

8. The method of claim 1 wherein the bid constraints include the following rules requiring that a volume commitment volcom and a spending commitment mrccom must be satisfied:

$$\sum_{n,t} x(n, s, t) \geq \sum_{d} volcom(s, d) \cdot y(s, d) \ \forall \, s \in (1 \ldots S)$$

$$\sum_{n,t,d} x(n, s, t) \cdot mrc(n, s, t, d) \cdot y(s, d) \geq \sum_{d} mrccom(s, d) \cdot y(s, d) \ \forall \, s \in (1 \ldots S).$$

9. The method of claim 1 wherein the bid constraints include the following rule requiring that bid bundle grouping constraints g must be respected:

$$x(n,s,t) \cdot g(n,s,t,j) = z(j) \forall n,s,t.$$

10. The method of claim 1 wherein the bid constraints include force to win constraints f:

$$\sum_{n,s,t} x(n, s, t) \cdot (1 - f(n, s)) = 0.$$

11. The method of claim 1 wherein the bid constraints include the following rule requiring that a total number of access circuits migrated from current suppliers to new suppliers is limited to mignum:

$$\sum_{n,s,t} x(n, s, t) \cdot (1 - cursp(n, s)) \leq mignum.$$

* * * * *